3,555,005
PROCESS FOR THE MANUFACTURE OF BENZENE AZO NAPHTHOIC ACID ARYLIDES PIGMENTS
Karl Ronco, Riehen, Switzerland, assignor to Ciba Limited, Basel, Switzerland, a company of Switzerland
No Drawing. Filed Sept. 18, 1967, Ser. No. 668,706
Claims priority, application Switzerland, Sept. 22, 1966, 13,686/66; Aug. 11, 1967, 11,360/67
Int. Cl. C07c *107/04;* C09b *29/20*
U.S. Cl. 260—204                    1 Claim

ABSTRACT OF THE DISCLOSURE

A process for the manufacture of azo pigments of the formula

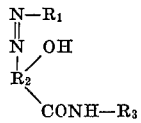

in which $R_1$ represents an aryl residue, $R_2$ represents a naphthalene residue in which the azo, hydroxyl and carboxylic acid amide groups are in 1,2,3-position and $R_3$ represents an aryl residue, and in which at least one of the residues represented by $R_1$ or $R_3$ contains in acylamino group or a carboxylic or sulphonic acid amide group which may be substituted, wherein a diazoamino compound containing a residue represented by $R_1$ is heated together with a naphthol of the formula

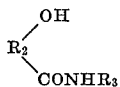

in an organic solvent or in an aqueous/organic solvent.

---

It is known that azo pigments may be obtained by coupling diazotized arylamines with 2,3-hydroxynaphthoic acid arylides in an aqueous medium. However, there are serious technical disadvantages to this process, even when working with simple naphthols. For example, most of the coupling components display their greates activity in the alkaline range, whereas many diazo compounds are subject to decomposition or intra-molecular rearrangement reactions under alkaline conditions, with the result that reaction is incomplete and contamination of the colourant occurs when coupling is carried out in an alkaline medium. It is also known that the pH value which obtains during coupling, as well as other factors, for example, the influence of temperature, and of impurities or surface-active compounds, determines the physical properties of the pigment formed. Since the physical properties of a pigment, for example, covering power or glazing power, tinctorial strength and brilliance, are of prime importance in respect of its application, there is no alternative, in the case of most azo pigments, but to carry out coupling in a pH range in which the coupling components used are present in the form of a suspension, due to the absence of groups imparting solubility. Thus, for example, a large number of technically important azo pigments must be manufactured in an acid medium, in which coupling sometimes proceeds very slowly.

A further technical disadvantage associated with the known coupling process is the lack of constancy in the properties of the azo pigments obtained. It is of paramount importance to the pigment-consuming industries that the manufacturer of azo pigments should supply a product which always conforms to a standard sample in respect of its properties. There are many risks associated with the manufacture of standard azo pigments, because it is essential that the manufacturing process be controlled in a manner such that the colourant is produced directly in the form required by the consumer; faults in pigments cannot be rectified subsequent to manufacture by purification, for example, by dissolution and reprecipitation, as in the case of soluble dyestuffs. There is a particularly serious risk in that small amounts of impurity in the starting materials or imperceptable deviations from the carefully worked out manufacturing process can jeopardize the success of the operation (cf. Ullmanns Enzyklopaedie der technischen Chemie, 3rd edition, vol. 4, page 157). Furthermore, every specialist knows that uncontrollable influences may cause the properties of a colourant to deviate considerably from those of the standard despite close adherence to prescribed manufacturing procedure.

When it is considered that the above-mentioned difficulties can arise when coupling is carried out with simple diazo and coupling components, it is evident that they can be considerably magnified when using complex components as required in the manufacture of azo pigments having high fastness to light and migration.

The present invention is based on the observation that pure azo pigments which correspond to the formula

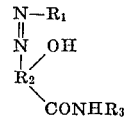

in which $R_1$ represents an aryl residue, $R_2$ represents a naphthalene residue in which the azo, hydroxyl and carboxylic acid amide groups are in 1,2,3-position and $R_3$ represents an aryl residue, and in which at least one of the residues represented by $R_1$ or $R_3$ contains an acylamino group or a carboxylic or sulphonic acid amide group which may be substituted, may be obtained in a simple manner in a form suitable for pigmenting purposes when a diazoamino compound containing a residue represented by $R_1$ is heated together with a naphthol of the formula

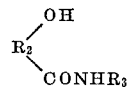

in an organic solvent, or if necessary, in an aqueous/organic solvent, preferably in the presence of an acid.

The aryldiazo amino compounds used in the process of the invention may be obtained by a known process by condensing an aryldiazonium salt with a primary amine or preferably a secondary amine. A very wide variety of amines are suitable for this purpose, for example, aliphatic amines, fore examples, methylamine, ethylamine, ethanolamine, propylamine, butylamine and hexylamine, and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid and α-aminoethylsulphuric acid, alicyclic amines, for example, cyclohexylamine, N-methylcyclohexylamine and dicyclohexylamine, aromatic amines, for example, 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid, and heterocyclic amines, for example, piperidine, morpholine, pyrrolidine and dihydroindole and also sodium cyanamide and dicyanodiamide.

Generally, the diazoamino compounds obtained are sparingly soluble in cold water and can be separated from the reaction medium in a crystallized form, if necessary, after salting out. In many cases, the moist press cake can be used in the further reaction. In individual cases it may be advantageous to dehydrate the diazoamino compounds by vacuum drying prior to the reaction or to remove the water by azeotropic distillation after suspending the moist press cake in a solvent.

The arylamines, from which the diazonium salts may be obtained by diazotization, preferably correspond to the formula

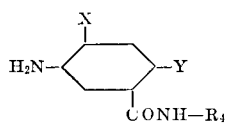

in which X represents a halogen atom or an alkyl, alkoxy, nitro or carbalkoxy group, Y represents a hydrogen or a halogen atom and $R_4$ represents a hydrogen atom or a benzene residue which may be substituted, for example, by halogen atoms or alkyl, trifluoromethyl, alkoxy, nitro, cyano, carbalkoxy or alkanoylamino groups.

The following arylamines may be mentioned as examples: aniline, and especially halogenated anilines, for example, 2-, 3- or 4-chloroaniline, 3,4-dichloroaniline, 2,3-dichloroaniline, 2,4-dichloroaniline, 2,5-dichloroaniline, 2,6-dichloroaniline, 2,4,5-trichloroaniline, 2,4,6-trichloroaniline, 2-, 3- or 4-bromoaniline, 2,4-dibromoanidine, 2,5-dibromoaniline, 2-methyl-5-chloroaniline, 2-methyl-4-chloroaniline, 2-methyl-3-chloroaniline and 2-chloro-5-trifluoromethylaniline, nitroanilines, for example, 2-, 3- and 4-nitroaniline, 4-chloro-2-nitroaniline, 2-chloro-4-nitroaniline, 4-methyl-3-nitroaniline, 2,4-dimethyl-3-nitroaniline, 2-methyl-5-nitroaniline and 2-methyl-4-nitroaniline, alkoxy- and phenoxy-anilines, for example, 2- and 4-methoxyaniline, 2- and 4-ethoxyaniline, 3-chloro-4-methoxyanline, 2-methoxy-5-nitroaniline, 2-methoxy-5-chloroaniline, 2-methoxy-5-trifluoromethylaniline, 2-amino-4-trifluoromethyl-4'-chlorodiphenylether, 2 - nitro - 4-ethoxyaniline, 2-methoxy-4-chloro-5-methylaniline, 2-amino-4-chlorodiphenylether, 2-amino-2'-4'-dichlorodiphenylether and 2-amino-4,4'-dichlorodiphenylether, and also 1-aminobenzene-2-carboxylic acid methyl ester, 1-aminobenzene-2-chloro-5-carboxylic acid methylester, 2-amino-5-nitrobenzoic acid methylester, 4-amino-3-nitrobenzotrifluoride, 2 - amino - 5 - nitrobenzotrifluoride, 1-amino-2-methylbenzene-5-carboxylic acid methylester, 1-amino-2-chlorobenzene-5-carboxylic acid methylamide, 2-amino-4-trifluoromethyldiphenylether, 2,5-dimethoxy-4-benzoylaminoaniline, 2,5-diethoxy-4-benzoylaminoaniline, 2,5-dimethyl-4-benzoylaminoaniline, 2-chloro-5-methoxy-4-benzoylaminoaniline and 2-methoxy-5-methyl-4-benzoylaminoaniline, but especially 4-methyl-3-aminobenzoic acid amide, 4-methyl-3-aminobenzoic acid anilide, 4-methyl-3-aminobenzoic acid-2'-chloro-5'-trifluoromethylanilide, 4-chloro-3-aminobenzoic acid amide, 4-chloro-3-aminobenzoic acid-2'-5'-dichloroanilide, 4-chloro-3-aminobenzoic acid-2'-chloro-5'-carbomethoxyanilide, 4-chloro-3-aminobenzoic acid-3'-chloroanilide, 4-chloro-3-aminobenzoic acid-2'-chloro-5'-trifluoromethylanilide, 4-chloro-3-aminobenzoic acid-3'-trifluoromethylanilide, 4-chloro-3-aminobenzoic acid-3',5'-bis-trifluoromethylanilide, 4-chloro-3-aminobenzoic acid-2',4',5'-trichloroanilide, 2,4-dichloro-5-aminobenzoic acid-2',5'-dichloroanilide, 2,4-dichloro-5-aminobenzoic acid-2',4'-dichloroanilide, 2,4-dichloro-5-aminobenzoic acid-3'-trifluoromethylanilide, 2,4-dichloro-5-aminobenzoic acid-3'-chloroanilide, 2,4-dichloro-5-aminobenzoic acid amide, 5-amino-4-methoxy-2-chlorobenzoic acid-3'-trifluoromethylanilide, 4-methyl-3-aminobenzoic acid-2',5'-dichloroanilide, 4-methyl-3-aminobenzoic acid-3'-trifluoromethylanilide, 4-methoxy-3-amino- benzoic acid amide, 4-methoxy-3-aminobenzoic acid anilide, 4-methoxy-3-aminobenzoic acid-3'-chloroanilide, 4-methoxy - 3 - aminobenzoic acid - 2',5' - dichloroanilide, 4-methoxy-3-aminobenzoic acid-2',4',5'-trichloroanilide, 4-carbomethoxy-3-aminobenzoic acid anilide, 4-methoxy-3-aminobenzoic acid-3'-trifluoromethylanilide, 4-carbethoxy-3-aminobenzoic acid-2',5'-dichloroanilide, 4-methoxy-3-aminobenzoic acid-3',5'-bis-trifluoromethylanilide, 4-methoxy - 3 - aminobenzoic acid - 2' - chloro - 5' - trifluoromethylanilide, 4-methoxy-3-aminobenzoic acid-2',5'-dimethoxy - 4' - chloroanilide, 4 - methoxy - 3 -aminobenzoic acid-2',5' dimethyl-4'-chloroanilide, 4-methoxy-3-aminobenzenesulphonic acid-2',5'-dichloroanilide and 4-chloro - 3-aminobenzenesulphonic acid - 2'-chloro-5'-trifluoromethylanilide.

The diazoamino compounds of these bases are coupled with 2,3-hydroxynaphthoic acid arylides, it being essential that at least one of the components contains an acylamino group or a carboxylic acid amide group that may be substituted.

Components that are of special interest are 2,3-hydroxynaphthoic acid arylides of the formula

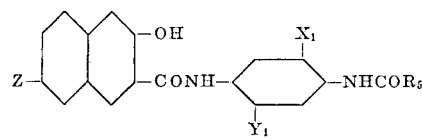

in which $X_1$ and $Y_1$ each represents a hydrogen or a halogen atom or an alkyl or alkoxy group, Z represents a hydrogen or a halogen atom or an alkoxy group, $R_5$ represents an alkyl group that may be substituted or a benzene residue that may be substituted, for example, by halogen atoms or alkyl, alkoxy or carbalkoxy groups, or an alkoxy, amino or alkylamino group or a phenylamino group that may be substituted in the phenyl residue, for example, by halogen atoms or alkyl, trifluoromethyl, alkoxy, nitro, cyano or carbalkoxy groups.

Components that also lead to the production of useful pigments are 2,3-hydroxynaphthoic acid arylides of the formula

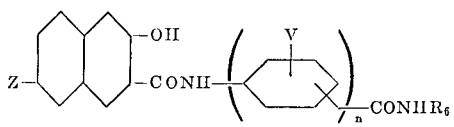

in which V represents a hydrogen or a halogen atom or an alkyl, alkoxy, phenoxy, carbalkoxy or alkylmercapto group, Z represents a hydrogen or a halogen atom or an alkoxy group, $R_6$ represents a hydrogen atom or a phenyl residue that may be substituted, for example, by halogen atoms or alkyl, alkoxy, phenoxy or carbalkoxy groups and $n$ stands for the integer 1 or 2.

The following 2,3-hydroxynaphthoic acid arylides may be mentioned as examples:

2,3-hydroxynaphthoic acid-anilide,
2,3-hydroxynaphthoic acid-ortho-toluidide,
2,3-hydroxynaphthoic acid-para-toluidide,
2,3-hydroxynaphthoic acid-ortho-anisidide,
2,3-hydroxynaphthoic acid-para-anisidide,
2,3-hydroxynaphthoic acid-para-phenetidide,
2,3-hydroxynaphthoic acid-2',5'-dimethoxyanilide,
2,3-hydroxynaphthoic acid-2',5'-dimethoxy-4'-chloroanilide,
2,3-hydroxynaphthoic acid-2',5'-dimethoxy-5'-chloroanilide, 2,3-hydroxynaphthoic acid-α-naphthylamide,
2,3-hydroxynaphthoic acid-β-naphthylamide,
2,3-hydroxynaphthoic acid-4'-formylaminoanilide,
2,3-hydroxynaphthoic acid-4'-acetylaminoanilide,
2,3-hydroxynaphthoic acid-4'-propionylaminoanilide,
2,3-hydroxynaphthoic acid-4'-butyrylaminoanilide,
2,3-hydroxynaphthoic acid-4'-chloroacetylaminoanilide,
2,3-hydroxynaphthoic acid-4'-trichloroacetylaminoanilide,
2,3-hydroxynaphthoic acid-4'-phenoxyacetylaminoanilide,
2,3-hydroxynaphthoic acid-4'-crotonylaminoanilide,
2,3-hydroxynaphthoic acid-4'-cinnamoylaminoanilide,
2,3-hydroxynaphthoic acid-4'-carbomethoxyaminoanilide,
2,3-hydroxynaphthoic acid-2'-methyl-4'-acetylaminoanilide,
2,3-hydroxynaphthoic acid-2'-chloro-4'-acetylaminoanilide,
2,3-hydroxynaphthoic acid-2'-methoxy-4'-acetylaminoanilide,
2,3- hydroxynaphthoic acid-2',5'-dimethyl-4'-acetylaminoanilide,
2,3-hydroxynaphthoic acid-2',5'-dimethyl-4'-formylaminoanilide,
2,3-hydroxynaphthoic acid-2',5'-dimethyl-4'-cinnamoylaminoanilide,
2,3-hydroxynaphthoic acid-2',5'-dimethyl-4'-benzenesulphonylaminoanilide,
2,3-hydroxynaphthoic acid-2',5'-dimethyl-4'-nicotinylaminoanilide,
2,3-hydroxynaphthoic acid-2',5'-dimethyl-4'-thiophene-1'-carbonylaminoanilide,
2,3-hydroxynaphthoic acid-2',5'-dimethyl-4'-carbethoxyaminoanilide,
2,3-hydroxynaphthoic acid-2',5'-dichloro-4'-acetylaminoanilide,
2,3-hydroxynaphthoic acid-2',5'-dichloro-4'-cinnamoylaminoanilide,
2,3-hydroxynaphthoic acid-2',5'-diethoxy-4'-acetylaminoanilide,
2,3-hydroxynaphthoic acid-2',5'-dimethoxy-4'-acetylaminoanilide,
2,3-hydroxynaphthoic acid-2'-chloro-5'-methyl-4'-acetylaminoanilide,
2,3-hydroxynaphthoic acid-2'-chloro-5'-methoxy-4'-acetylaminoanilide,
2,3-hydroxynaphthoic acid-4-benzoylaminoanilide,
2,3-hydroxynaphthoic acid-2',5'-dichloro-4'-benzoylaminoanilide,
2,3-hydroxynaphthoic acid-2',5'-dichloro-4'-benzoylaminoanilide, 2,3-hydroxynaphthoic acid-2',5'-dichloro-4'-(4''-chlorobenzoylamino)-anilide,
2,3-hydroxynaphthoic acid-2',5'-dichloro-4'-(2'',4''-dichlorobenzoylamino)-anilide,
2,3-hydroxynaphthoic acid-2',5'-dichloro-4'-(2'',5''-dichlorobenzoylamino)-anilide,
2,3-hydroxynaphthoic acid-2',5'-dichloro-4'-(4''-methylbenzoylamino)-anilide,
2,5-dimethoxy-4-(2'-hydroxy-3'-naphthoylamino)-benzenesulphonic acid-(2'',5''-dichloro)-anilide, 2,3-hydroxynaphthoic acid-2',5'-dichloro-(4''-phenylbenzoylamino)-anilide,
2,3-hydroxynaphthoic acid-2',5'-dimethyl-4'-benzoylaminoanilide,
2,3-hydroxynaphthoic acid-2',5'-dimethyl-4'-(4''-chlorobenzoylamino)-anilide,
2,3-hydroxynaphthoic acid-2',5'-dimethyl-4'-(2'',4''-dichlorobenzoylamino)-anilide,
2,3-hydroxynaphthoic acid-2',5'-dimethyl-4'-(2'',5''-dichlorobenzoylamino)-anilide,
2,3-hydroxynaphthoic acid-2',5'-dimethyl-4'-(4''-methylbenzoylamino)-anilide,
2,3-hydroxynaphthoic acid-2',5'-dimethyl-4'-(4''-phenylbenzoylamino)-anilide,
2,3-hydroxynaphthoic acid-2',5'-dimethyl-4'-(4''-methoxybenzoylamino)-anilide,
2,3-hydroxynaphthoic acid-2'-chloro-5'-methyl-4'-benzoylaminoanilide,
2,3-hydroxynaphthoic acid-2'-chloro-5'-methyl-4'-(4''-chlorobenzoylamino)-anilide,
2,3-hydroxynaphthoic acid-2'-chloro-5'-methyl-4'-(2'',5''-dichlorobenzoylamino)-anilide,
2,3-hydroxynaphthoic acid-2'-chloro-5'-methyl-4'-(4''-methylbenzoylamino)-anilide,
2,3-hydroxynaphthoic acid-2'-chloro-5'-methyl-4'-(4''-phenylbenzoylamino)-anilide,
2,3-hydroxynaphthoic acid-2'-methoxy-5'-chloro-4'-benzoylaminoanilide,
2,3-hydroxynaphthoic acid-2'-methoxy-5'-chloro-4'-(4''-chlorobenzoylamino)-anilide,
2,3-hydroxynaphthoic acid-2'-methoxy-5'-chloro-4'-(2'',5''-dichlorobenzoylamino)-anilide,
2,3-hydroxynaphthoic acid-2'-methoxy-5'-chloro-4'-(4''-methylbenzoylamino)-anilide,
2,3-hydroxynaphthoic acid-2'-methoxy-5'-chloro-4'-(4''-phenylbenzoylamino)-anilide,
2,3-hydroxynaphthoic acid-4'-(4''-carbomethoxybenzoylamino)-anilide,
2,3-hydroxynaphthoic acid-2',5'-dichloro-4'-(4''-carbethoxybenzoylamino)-anilide,
2,3-hydroxynaphthoic acid-2',5'-dimethyl-4'-(4''-carbomethoxybenzoylamino)-anilide,
2,3-hydroxynaphthoic acid-4'-(4''-chlorobenzoylamino)-anilide,
2,3-hydroxynaphthoic acid-(4''-methylbenzoylamino)-anilide,
2,3-hydroxynaphthoic acid-4'-(4''-methoxybenzoylamino)-anilide,
2,3-hydroxynaphthoic acid-4'-(3''-acetylaminobenzoylamino)-anilide,
2,3-hydroxynaphthoic acid-4'-(4''-phenylbenzoylamino)-anilide,
and also the 2,3-hydroxynaphthoic acid arylides obtained by reacting 2,3-hyroxynaphthoic acid chloride with the following ureas:
4-aminodiphenylurea,
4-amino-4'-chlorodiphenylurea,
4-amino-4'-methyldiphenylurea,
4-amino-4'-methoxydiphenylurea,
4-amino-2-methyldiphenylurea,
4-amino-3-methyldiphenylurea,
4-amino-2-chlorodiphenylurea,
4-amino-2,5-dimethyldiphenylurea,
4-amino-2,5-dimethyl-4'-chlorodiphenylurea,
4-amino-2,5,4'-trimethyldiphenylurea,
4-amino-2,5-dichlorodiphenylurea,
4-amino-2,5,4'-trichlorodiphenylurea,
4-amino-2-methyl-5-chlorodiphenylurea,
4-amino-2-methoxy-5-chlorodiphenylurea,
4-amino-2-methoxy-5,4'-dichlorodiphenylurea,
4-amino-2,5-dichloro-4'-methoxydiphenylurea,
4-amino-2,4'-dichlorodiphenylurea,
4-amino-2-chloro-3'-trifluoromethyldiphenylurea,
3-amino-4,2'-dichloro-5'-trifluoromethyldiphenylurea,
4-amino-2,5-dimethylphenyl-α-naphthylurea,
4-amino-2,5-dichlorophenyl-β-naphthylurea,
4-aminophenyl-α-naphthylurea,
4-amino-2-methylphenyl-α-naphthylurea,
4-amino-2,5-dimethyl-3'-chlorodiphenylurea,
4-amino-2,5-dimethyl-4'-methoxydiphenylurea,
4-amino-2,5-dimethyl-4'-methyldiphenylurea,
4-amino-2,5-dichloro-3'-chlorodiphenylurea,
4-amino-2,5-dichloro-4'-methyldiphenylurea,
4-amino-5-methoxy-2-chlorodiphenylurea,
3-amino-4,2'-dichloro-5'-trifluoromethyldiphenylurea,
3-amino-4,2'-dichloro-5'-carbomethoxydiphenylurea,
3-amino-4,2',5'-trichlorodiphenylurea,
4-amino-3'-trifluoromethyldiphenylurea,
4-amino-2'-chloro-5'-trifluoromethyldiphenylurea,
4-amino-2'-chloro-5'-carbomethoxydiphenylurea,
4-amino-2',5'-dichlorodiphenylurea, 4-amino-4′-methoxydiphenylurea,
4-amino-4′-acetylaminodiphenylurea,
4-amino-4′-carbomethoxydiphenylurea,
4-amino-2′,4′-dichlorodiphenylurea,
4-amino-2,5-dimethoxydiphenylurea,
4-amino-2,5-dimethoxy-4′-chlorodiphenylurea,
4-amino-2,5-dimethylphenylbenzylurea,
4-aminophenylbenzylurea,
4-aminophenylbutylurea,
4-aminophenylmethylurea,
4-amino-5-chloro-2-methoxy-4′-acetylaminodiphenylurea,
4-amino-2,5-dimethyl-4′-acetylaminodiphenylurea,
4-amino-5-chloro-2-methoxyphenylmethylurea,
4-amino-2,5-dimethylphenylmethylurea,
4-amino-2,5-dichlorophenylmethylurea,
4-amino-2′,4′-5-trichlorol-2-methoxydiphenylurea and
4-amino-2-methylphenylmethylurea.

Finally, mention may be made of the 2,3-hydroxynaphthoic acid arylides obtained by condensing 2,3-hydronaphthoic acid chloride with the following aminobenzoic acid arylides:

4-aminobenzoic acid-phenylamide,
4-aminobenzoic acid-4′-chlorophenylamide,
4-aminobenzoic acid-2′,4′-dichlorophenylamide,
4-aminobenzoic acid-2′-chloro-5′-trifluoromethylphenylamide,
4-amino-3-methylbenzoic acid-3′-trifluoromethylphenylamide,
4-amino-3-methylbenzoic acid-4′-chlorophenylamide,
4-chloro-3-aminobenzoic acid-phenylamide,
4-chloro-3-aminobenzoic acid-2′,4′-dichlorophenylamide,
4-chloro-3-aminobenzoic acid-2′,5′-dichlorophenylamide,
4-chloro-3-aminobenzoic acid 2′-chloro-5′-trifluoromethylanilide,
4-methyl-3-aminobenzoic acid-phenylamide,
3-aminobenzoic acid-phenylamide,
3-aminobenzoic acid-2′,5′-dichlorophenylamide,
3-aminobenzoic acid-2′,4′,5′-trichlorophenylamide,
3-aminobenzoic acid-2′-chloro-5′-trifluoromethylphenylamide,
3-aminobenzoic acid-3′-trifluoromethylphenylamide,
4-methyl-3-aminobenzoic acid-2′,5′-dichlorophenylamide,
4-methyl-3-aminobenzoic acid-2′,4′,6′-trichlorophenylamide,
4-methyl-3-aminobenzoic acid-3′-trifluoromethylphenylamide,
4-methyl-3-aminobenzoic acid-2′-chloro-5′-trifluoromethylphenylamide,
4-methyl-3-aminobenzoic acid-2′-chloro-5′-carbethoxyphenylamide,
5-amino-2,4-dichlorobenzoic acid-3′-chlorophenylamide,
5-amino-2,4-dichlorobenzoic acid-2′,4′-dichlorophenylamide,
5-amino-2,4-dichlorobenzoic acid-2′,5′-dichlorophenylamide,
5-amino-2,4-dichlorobenzoic acid, 2′,4′, 5′-trichlorophenylamide,
5-amino-2,4-dichlorobenzoic acid-3′-trifluoromethylphenylamide,
4-chloro-3-aminobenzoic acid-2′,4′-dichloro-5′-carboparachlorophenoxyphenylamide.
4-methoxy-3-aminobenzoic acid-2′,5′-dichlorophenylamide,
4-methoxy-3-aminobenzoic acid -2′-chloro-5′-trifluoromethylphenylamide and 4-methoxy-3-aminobenzoic acid-3′,5′,-di-trifluoromethylphenylamide.

Coupling of the diazoamino compounds with the naphthol is effected in an organic solvent, for example, chlorobenzene, ortho-dichlorobenzene, nitrobenzene, pyridine, ethyleneglycol, ethyleneglycol monomethylether, ethyleneglycol monoethylether, dimethylformamide, formic acid or acetic acid. When using solvents which are miscible with water it is not necessary to use the diazoamino compounds in anhydrous form. For example, the water-moist filter cake can be used. Splitting of the diazoamino compound, which precedes coupling, is carried out in an acid medium. When a neutral solvent is used it is necessary to add an acid, so as to have an acid medium for example, hydrogen chloride, sulphuric acid, formic acid or acetic acid.

Coupling is advantageously carried out with the application of heat, preferably at a temperature between 80 and 180° C., and it generally proceeds very quickly and is complete.

By virtue of their insolubility, the pigments obtained may be isolated from the reaction mixture by filtration. Since the by-products remain in solution, the pigments obtained have a high degree of purity. In most cases, an after-treatment with organic solvents, as required in the case of pigments made by coupling in an aqueous medium, is thus superfluous. Further advantages associated with the process of the invention are the high yield, the fact that the pigments are produced in a form suitable for pigmenting purposes, and the constant properties of the pigments.

By virtue of their properties, the pigments obtained by the process of the invention may be advantageously used for a very wide variety of purposes. For example, they may be used in a state of fine division for the spin-colouration of filament and staple-fibre viscose, cellulose ethers, cellulose esters, polyamides, polyurethaness and polyesters, and also in the production of coloured lacquers and lake-formers, solutions or products made from acetylcellulose, nitrocellulose, natural or synthetic resins, for example, polymerization resins or condensation resins, for example, aminoplasts, alkyd resins, phenoplasts, and also polyolefines, for example, polystyrene, polyvinyl chloride, polyethylene, polypropylene, polyacrylonitrile, rubber, casein, silicones and silicone resins. They may also be used advantageously in the manufacture of coloured pencils, cosmetic preparations and laminated sheet material.

The following examples illustrate the invention. Unless otherwise stated, the parts and percentages are by weight.

EXAMPLE 1

40.6 parts of the diazoamino compound of the formula

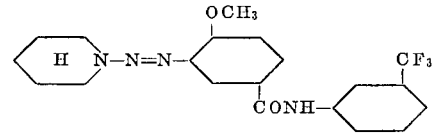

obtained by coupling diazotized 4-methoxy-3-aminobenzoic acid - (3′ - trifluoromethyl) - anilide with piperidine an alkaline medium, and 38.2 parts of 2-hydroxy-3-naphthoic acid-(4′-benzoylamino)-anilide are suspended in 800 parts of orthodichlorobenzene, the suspension is heated to 60 to 70° C., and then 80 parts of glacial acetic acid are added. The batch is stirred for one hour at 120 to 130° C., at the end of which period splitting of the diazoamino compound and coupling to form the pigment in a pure organic medium are finished. The red pigment is isolated from the hot reaction mixture by filtration, washed successively with hot ortho-dichlorobenzene, methanol and water and dried in vacuo at 80° C. 65.5 parts of the monoazo pigment of the formula

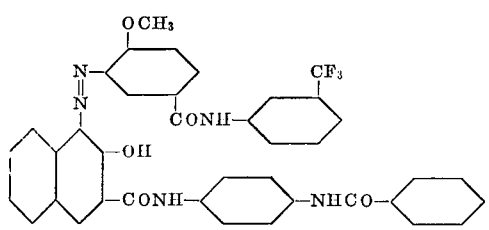

are obtained, which corresponds to a yield of 93%. The pigment is sparingly soluble to insoluble in the common solvents and colours polyvinyl chloride bluish red shades possessing excellent fastness to light, overstripe bleeding and migration.

Equally good results may be obtained when the pure diazoamino compound used according to this example is replaced by a press cake having a water content of approximately 10%.

Diazoamino compounds may be reacted with naphthols in a corresponding manner to form pigments.

The following table lists components that may be used for the manufacture of further pigments. The pigments may be obtained by coupling the diazoamino compounds derived from the diazo compounds of the aminobenzenes listed in Column I and the amines listed in Column II with the coupling components given in Column III in the manner described in this example. The shades produced in polyvinyl chloride film are indicated in Column IV.

EXAMPLE 2

A mixture is prepared from 65 parts of stabilized polyvinyl chloride, 35 parts of dioctyl phthalate and 0.2 part of the pigment obtained in the manner described in the first paragraph of Example 1 and then worked to and fro for 7 minutes at 140° C. on a two-roller mill. A pure, bluish red film possessing very good fastness to light and migration is obtained.

I claim:

1. A process for the manufacture of azo pigments of the formula

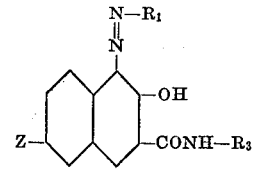

|   | I | II | III | IV |
|---|---|---|---|---|
| 1 | 4-chloro-3-aminobenzoic acid-(2',5'-dichloro)-anilide. | Methyltaurine | 2-hydroxy-3-naphthoic acid-(4'-[4''-phenyl]-benzoylamino)-anilide. | Red. |
| 2 | do | Diethylamine | 2-hydroxy-3-naphthoic acid-(4'-[4''-methoxy]-benzoylamino-2'-methoxy)-anilide. | Scarlet. |
| 3 | do | do | 2-hydroxy-3-naphthoic acid-(4'-[4''-chloro]-benzoylamino-2'-methoxy-5'-methyl)-anilide. | Do. |
| 4 | 2,4-dichloro-5-aminobenzoic acid-(2',4'-dichloro)-anilide. | Piperidine | 2-hydroxy-3-naphthoic acid-(4'-benzoylamino)-anilide. | Do. |
| 5 | 4-methyl-3-aminobenzoic acid-(3'-trifluoromethyl)-anilide. | do | do | Red. |
| 6 | 4-methoxy-3-aminobenzoic acid-(3'-trifluoromethyl)-anilide. | Sarcosine | 2-hydroxy-3-naphthoic acid-(2',5'-dimethyl-4'-benzoylamino-anilide. | Bluish red. |
| 7 | do | Sulphanilic acid | 2-hydroxy-3-naphthoic acid-(2',5'-dimethoxy-4'-[4''-chloro]-benzoylamino-anilide. | Do. |
| 8 | do | do | 6-bromo-2-hydroxynaphthoic acid-(4'-benzoylamino) anilide. | Claret. |
| 9 | do | Piperidine | 6-methoxy-2-hydroxy-3-naphthoic acid-(4'-benzoylamino)-anilide. | Red-violet. |
| 10 | 4-chloro-3-aminobenzoic acid-(2',5'-dichloro)-anilide. | do | 3-methyl-4-(2'-hydroxy-3'-naphthoylamino)-benzoic acid-(2''-chloro-5''-trifluoromethyl)-anilide. | Orange. |
| 11 | 4-chloro-3-amino-benzoic acid-(2',5'-dichloro)-anilide. | Sarcosine | 2-hydroxy-3-naphthoic acid-(2',5'-dimethyl-4'-benzene-sulphonylamino)-anilide. | Navy blue. |
| 12 | 2,5-dimethoxy-4-benzoylaminoaniline | Aminoacetic acid | 2-hydroxy-3-naphthoic acid-anilide | Do. |
| 13 | 2,4-dichloro-5-aminobenzoic acid-(2',5'-dichloro)-anilide. | Piperidine | 4-(2'-hydroxy-3'-naphthoylamino)-benzoic acid-(2''-chloro-5''-trifluoromethyl)-anilide. | Red-orange. |
| 14 | 4-chloro-3-aminobenzoic acid-(2',5'-dichloro)-anilide. | do | 2-hydroxy-3-naphthoic acid-(4'-[4''-carbo-methoxy]-benzaylamino)-anilide. | Scarlet. |
| 15 | 4-chloro-3-aminobenzoic acid-(2'-chloro-5'-trifluoromethyl)-anilide. | do | 2-hydroxy-3-naphthoic acid-(4'-[4''-chloro]-benzoylamino)-anilide. | Do. |
| 16 | 4-chloro-3-amino-benzotrifluoride | do | 2-hydroxy-3-naphthoic acid-(4'-benzolyamino)-anilide. | Orange. |
| 17 | 2,4,5-trichloroaniline | do | do | Scarlet. |
| 18 | do | do | 2-hydroxy-3-naphthoic acid-(4'-[4''-chloro]-benzoylamino)-anilide. | Do. |
| 19 | 4-amino-3-nitrobenzotrifluoride | Morpholine | 3-(2'-hydroxy-3'-naphthoylamino)-4-chloro-(2''-chloro-5''-trifluoromethyl)-anilide. | Orange. |
| 20 | 2-methoxy-5-chloro-4-benzoylaminoaniline | Diethanolamine | 2-hydroxy-3-naphthoic acid-(4'-benzoylamino)-anilide. | Violet. |
| 21 | 4-methoxy-3-aminobenzoic acid-(3'-trifluoromethyl)-anilide. | Dimethylamine | 2-hydroxy-3-naphthoic acid-(2',5'-dimethyl-4'-acetylamino)-anilide. | Bluish red. |
| 22 | 4-methoxy-3-aminobenzoic acid-(3'-trifluoromethyl)-anilide. | Cyanamide | 2-hydroxy-3-naphthociacid-(4'-benzoylamino)-anilide. | Bluish red. |
| 23 | do | Diethylamine | 2,5-dimethoxy-4-(2'-hydroxy-3'-naphthoyl-amino)-benzene-sulphonic acid-(2'',5''-dichloro)-anilide. | Red. |
| 24 | 2,4-dichloro-5-aminobenzoic acid-(2'-chloro-5'-trifluoromethyl)-anilide. | Cyclohexylamine. | 4-(2'-hydroxy-3'-naphthoylamino)-benzoic acid-2'',5''-dichloro)-anilide. | Orange. |
| 25 | 4-ethylsulphone-3-aminobenzene trifluoride | do | 2-hydroxy-3-naphthoic acid-(4'-[4''-methoxy]-benzoylamino)-anilide. | Do. |
| 26 | 4-ethylsulphone-3-aminobenzenetrifluoride | Piperidine | 2-hydroxy-3-naphthoic acid-(4'-[4''-carbomethoxy]-benzoylamino)-anilide. | Yellow-orange. |
| 27 | 3-chloro-2-methylaniline | do | 2-hydroxy-3-naphthoic acid-(4'-[4''-chloro]-benzoylamino)-anilide. | Claret. |
| 28 | 5-chloro-2-methoxyaniline | do | 2-hydroxy-3-naphthoic acid-4-benzoylamino anilide | Blue-red. |
| 29 | 2,5-dichloroaniline | Diethylamine | 2-hydroxy-3-naphthoic acid-(4'-[4''-chloro]-benzoylamino)-anilide. | Scarlet. |
| 30 | Anthranilic acid-methylester | do | 2-hydroxy-3-naphthoic acid-(4'-[4''-chloro]-benzoylamino)-anilide. | Orange. |
| 31 | 4-chloro-3-aminobenzoic acid-(2',4'-dichloro)-anilide. | Piperidine | 2-hydroxy-3-naphthoic acid-B-naphthylamide. | Red. |
| 32 | 4-chloro-3-amino-benzoic acid-(2',4',5'-trichloro)-anilide. | do | 2-hydroxy-3-naphthoic acid-β-naphthylamide. | Do. |
| 33 | 4-methoxy-3-aminobenzoic acid-(3'-trifluoromethyl)-anilide. | do | 2-hydroxy-3-naphthoic acid-4'-acetylaminoanilide. | Blue-red. |
| 34 | 4-methoxy-3-aminobenzoic acid-anilide | do | 2-hydroxy-3-naphthoic acid-4'-benzoylaminoanilide. | Do. |
| 35 | 4-methoxy-3-aminobenzoic acid-(2'-chloro-5'-trifluoromethyl)-anilide. | Diethylamine | 2-hydroxy-3-naphthoic acid-4'-benzoylaminoanilide. | Do. | in which $R_1$ represents a benzene radical, $R_3$ a group of the formula

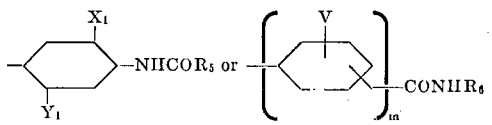

in which $X_1$ and $Y_1$ each represents a hydrogen or chloro atom, a lower alkyl or lower alkoxy group, $R_5$ a hydrogen atom, lower alkyl or lower alkoxy group, a phenyl group that may be substituted by chorine, lower alkyl, or phenyl group, a naphthyl radical, an amino, lower alkylamino, or a phenylamino group that may be substituted by chlorine, bromine, lower alkyl, lower alkoxy, or trifluoromethyl groups, V represents a hydrogen, chlorine, bromine, lower alkyl, lower alkoxy, phenoxy, lower carbalkoxy or lower alkylmercapto group, $R_6$ represents a hydrogen atom or a phenyl group that may be substituted by chlorine, bromine, lower alkyl, lower alkoxy or trifluoromethyl groups, Z represents a hydrogen, bromine or a lower alkoxy group and $m$ stands for the integer 1 or 2, wherein a diazoamino compound containing a radical represented by $R_1$ is heated at a temperature between 80 and 180° C. together with a naphthol of the formula

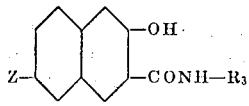

in an organic solvent the medium being acidic.

References Cited

UNITED STATES PATENTS

| | | | |
|---|---|---|---|
| 1,522,089 | 1/1925 | Wagner et al. | 260—203 |
| 2,013,723 | 9/1935 | Zwilgmeyer | 260—204 |
| 2,048,844 | 7/1936 | Dahlen et al. | 260—203(X) |
| 2,897,186 | 7/1959 | Miller et al. | 260—204(X) |
| 3,174,961 | 3/1965 | Ronco | 260—203 |

CHARLES B. PARKER, Primary Examiner

C. F. WARREN, Assistant Examiner

U.S. Cl. X.R.

260—140, 203